(12) United States Patent
Zhang

(10) Patent No.: US 11,596,879 B2
(45) Date of Patent: Mar. 7, 2023

(54) FILTER PRESS

(71) Applicant: Shanghai Liqing Equipment Co., Ltd., Shanghai (CN)

(72) Inventor: Xinqiang Zhang, Shanghai (CN)

(73) Assignee: Shanghai Liqing Equipment Co., Ltd., Shanghai (CN)

( * ) Notice: Subject to any disclaimer, the term of this patent is extended or adjusted under 35 U.S.C. 154(b) by 287 days.

(21) Appl. No.: 16/987,357

(22) Filed: Aug. 6, 2020

(65) Prior Publication Data

US 2022/0040602 A1    Feb. 10, 2022

(51) Int. Cl.
*B01D 25/21* (2006.01)
*B01D 25/32* (2006.01)

(52) U.S. Cl.
CPC ........... *B01D 25/215* (2013.01); *B01D 25/32* (2013.01); *B01D 2201/043* (2013.01); *B01D 2201/0415* (2013.01); *B01D 2201/30* (2013.01)

(58) Field of Classification Search
CPC .................. B01D 25/215; B01D 25/32; B01D 2201/0415; B01D 2201/043; B01D 2201/30; B01D 2201/0423; B01D 25/38

USPC ........ 210/224–231, 346–347, 486, 108, 275, 210/411, 425
See application file for complete search history.

(56) References Cited

U.S. PATENT DOCUMENTS

2005/0199559 A1\* 9/2005 Duby .................. B01D 25/215
                                                          210/791

\* cited by examiner

*Primary Examiner* — Madeline Gonzalez
(74) *Attorney, Agent, or Firm* — Bayramoglu Law Offices LLC

(57) ABSTRACT

A filter press includes a frame, a hydraulic system for compressing and releasing filter plates, the filter plates, a filter chamber, a feed pump, a high-pressure clean water pump, a control system, a rotating plate, a cake removal knife, a squeeze disc, a squeeze disc sleeve, a drive shaft, a brake, a left pull rod, a right pull rod, a pull rod disc, a connector and clutches. The filter cake in the entire filter press can be removed without opening the filter plates in sequence. The filter cake washing is carried out in an enclosed room in a normal direction and a reverse direction, which can not only maintain the dryness and cleanness of the working environment, but also can effectively collect, process treat and recycle the washing water, thus achieving the zero discharge of waste water to meet the environmental requirements at a low cost.

9 Claims, 9 Drawing Sheets

FILTER PRESS

TECHNICAL FIELD

The present invention relates to a solid-liquid separation machine, and more specifically, to a filter press using pressure filtration.

BACKGROUND

The filtering process of current filter presses requires that a significant external force be exerted to tightly press the filter units. When the feed pump is deactivated, the filter cake is forced under pressure to pass through membranes, or is directly removed by opening the filter plates in sequence for washing. Alternatively, some prior devices vibrate the filter plates or disengage the filter cloths from the filter plates in sequence to remove the filter cake. Washing the filter cake is typically done in an open space where it is difficult to maintain the ambient in a dry and clean condition. Using open spaces for washing also presents inconveniences and adds expense relating to the treatment, use and recycling of the washing water. The filter cake discharge and washing are labor intensive, time consuming and thus have low efficiency as well. Other shortcomings of prior solid-liquid filtering systems and methods are related to the materials themselves. The membranes are expensive and have a short service life. And compressed air used to force-squeeze the filter cake requires large and cumbersome mechanical equipment that takes up needed operation space and produces excessive noise.

SUMMARY

In order to overcome the above-mentioned shortcomings of the prior art, the present invention provides a filter press capable of instantly and fully removing the filter cake without opening the filter plates in sequence; allowing washing in an enclosed room in a normal direction and a reverse direction; maintaining the dryness and cleanness of the working environment, and effectively collecting, treating and recycling the washing water thus achieving the zero discharge of waste water to meet the environmental requirements at a low cost; and achieving the same function without the use of membranes and compressed air.

The filter press of the present invention includes a frame, a hydraulic system for compressing and releasing filter plates, the filter plates, a filter chamber, a feed pump, a high-pressure clean water pump, a control system, a rotating plate, a cake removal knife, a squeeze disc, a squeeze disc sleeve, a drive shaft, a brake, a left pull rod, a right pull rod, a pull rod disc, a connector and clutches. The filter chamber is formed between the inner cylindrical surface of two adjacent filter plates and two inner end surfaces in the inner cylindrical surface. The filter plates are spaced apart by a support part and a liquid-permeable pressure equalizing part. Four holes are formed around the filter plate, wherein one of the holes on the upper side is connected to the clean water pump, and the other hole on the upper side is connected to the feed pump. The washed water passes through cross recesses on the filter plate into a washing water collector via a lower hole. The collector is provided with a filter screen. The particulate filter cake is discharged directly into a cake discharge port. The clear washing water flows into a clean water tank, and the remaining slurry is fed into the filter press by the feed pump. The filtrate is received by the other lower hole of the four holes on the lower side around the filter plate. The drive shaft is tubular and can act as a feed tube with a feed inlet connected to each filter chamber. The rotating plate and the drive shaft are slidably connected by a key. The squeeze disc sleeve is located at the interface between the two end surfaces of the filter chamber and the two adjacent filter plates, and is sleeved on the outer cylindrical surface of the cylindrical hole in the center of the filter plate. The annular center of the squeeze disc is engaged in an annular groove of the squeeze disc sleeve. The left pull rod and the right pull rod are arranged symmetrically with respect to the axis of the drive shaft. The left pull rod and the right pull rod are spaced apart and pass through the pull rod discs located at two ends of the frame, respectively. Each of the two pull rod discs is fixed to a brake that is hydraulically controlled or electronically controlled to be opened or closed. The brake controls the axial displacement or synchronous displacement between the left pull rod or the right pull rod and the pull rod disc, respectively. The left pull rod is fixedly connected to the pull rod disc on the right side of the frame, and is slidably connected to and passes through the pull rod disc on the left side of the frame. The pull rod disc on the left side of the frame is fixedly connected to the right pull rod, and the right pull rod is slidably connected to and passes through the pull rod disc on the right side of the frame. The left pull rod and the right pull rod are connected to one end of the connector, respectively, and the other end of the connector passes through the outer cylindrical surface of the drive shaft and is fixedly connected to the squeeze disc sleeve. The connector passes through the drive shaft and has a gap for moving along the axial direction of the drive shaft.

The head of the cake removal knife closely abuts on the cylindrical surface of the filter chamber. The two sides of the cake removal knife closely abut on the two end surfaces of the filter chamber. The cake removal knife is fixed in the two end surfaces of the two adjacent filter plates by a fixed pin of the cake removal knife. The fixed pin of the filter removal knife passes through the rotating plate, and is limited within a circular gauge on the rotating plate. Ribs and fluid ports are spaced apart on the squeeze disc. A clamping piece is fixed on the squeeze disc and closely abuts on the end surface of the filter chamber. The clamping piece fixes the filter cloth on the squeeze disc by a fastener or a buckle. The clamping piece is provided with a filtrate channel connected to the recess on the surface of the filter plate.

The left pull rod and the right pull rod can be arranged on the edge of the filter plate and pass through all the filter plates and pull rod discs, and are symmetrically arranged with respect to the axis of the filter plate. The distance between the left pull rod or the right pull rod and the drive shaft is greater than the outer diameter of the inner cylindrical surface of the filter chamber. The left pull rod and the right pull rod are fixed to the squeeze disc in the pull direction of all the filter chambers by the connector, and slidably connected to the squeeze disc in the thrust direction. The connector can move left and right in the axial gap on the filter plate. A sealing member is arranged on the filter plate to seal the channel between the gap and the outside. The other upper hole of the four holes around the filter plate acts as a feed channel. A drive clutch and a pair of driven clutches are arranged inside the cylindrical hole in the center of the filter press. The drive clutch and the drive shaft are both controlled by the brake to synchronously rotate, move or be disengaged. The pair of driven clutches are interlocked with each other, wherein when one of the driven clutches is engaged with the drive clutch, the other driven clutch is disengaged from the drive clutch, and vice versa. One of the driven clutches and the drive clutch jointly control the rotating plate to rotate, and the other driven clutch and the drive clutch control the squeeze disc to squeeze the filter cake.

The advantages of the present invention are as follows. The filter cake can be squeezed without the use of membranes and compressed air. When removing the filter cake, the cake removal knife contacts the clamping piece to scrape off the filter cake without contacting the filter cloth and the recessed filter plate, so that the filter cakes are completely removed without dead corners, and it is not necessary to apply an external force for making the filter cloth disengaged from the filter plate and the filter cakes, which dramatically prolongs the service life of the filter cloth. The filter cakes in the entire filter press can be instantly removed completely without opening the filter plates in sequence, which significantly reduces the process time. The cleaning of the filter plate, filter cloth and filter chamber is carried out in the enclosed room by normal washing and reverse washing in turn, which has high efficiency and good cleaning effect to maintain the cleanness of the working environment, and can effectively recycle the washing water, thus achieving the zero discharge of waste water.

DETAILED DESCRIPTION OF THE EMBODIMENTS

The present invention will be further illustrated hereinafter with reference to the drawings.

Figure 1:
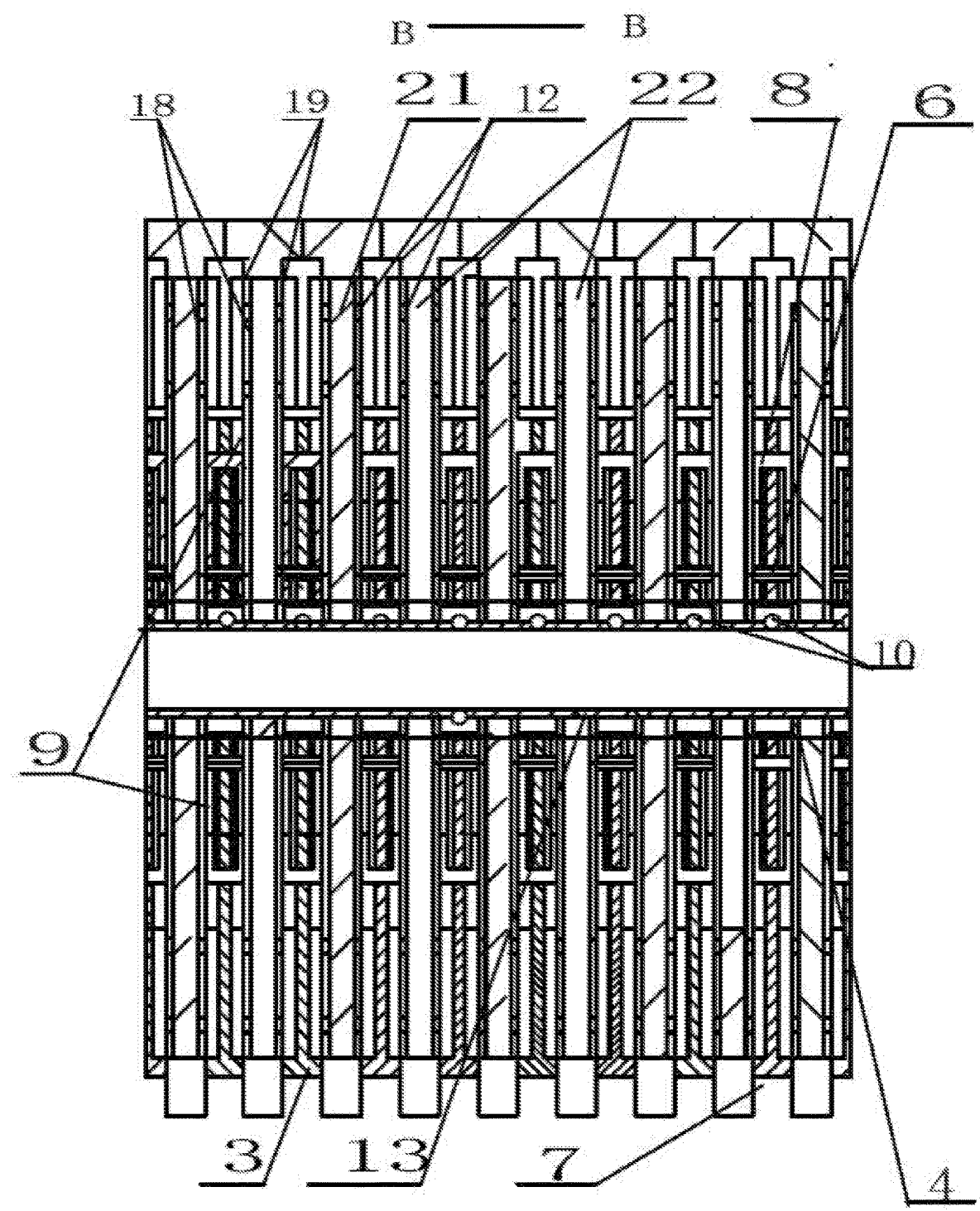
FIG. 1 is a structural schematic diagram of the present invention (without the frame and the hydraulic system) and is a cross-sectional view taken along section B-B in FIG. 2.
Figure 2:
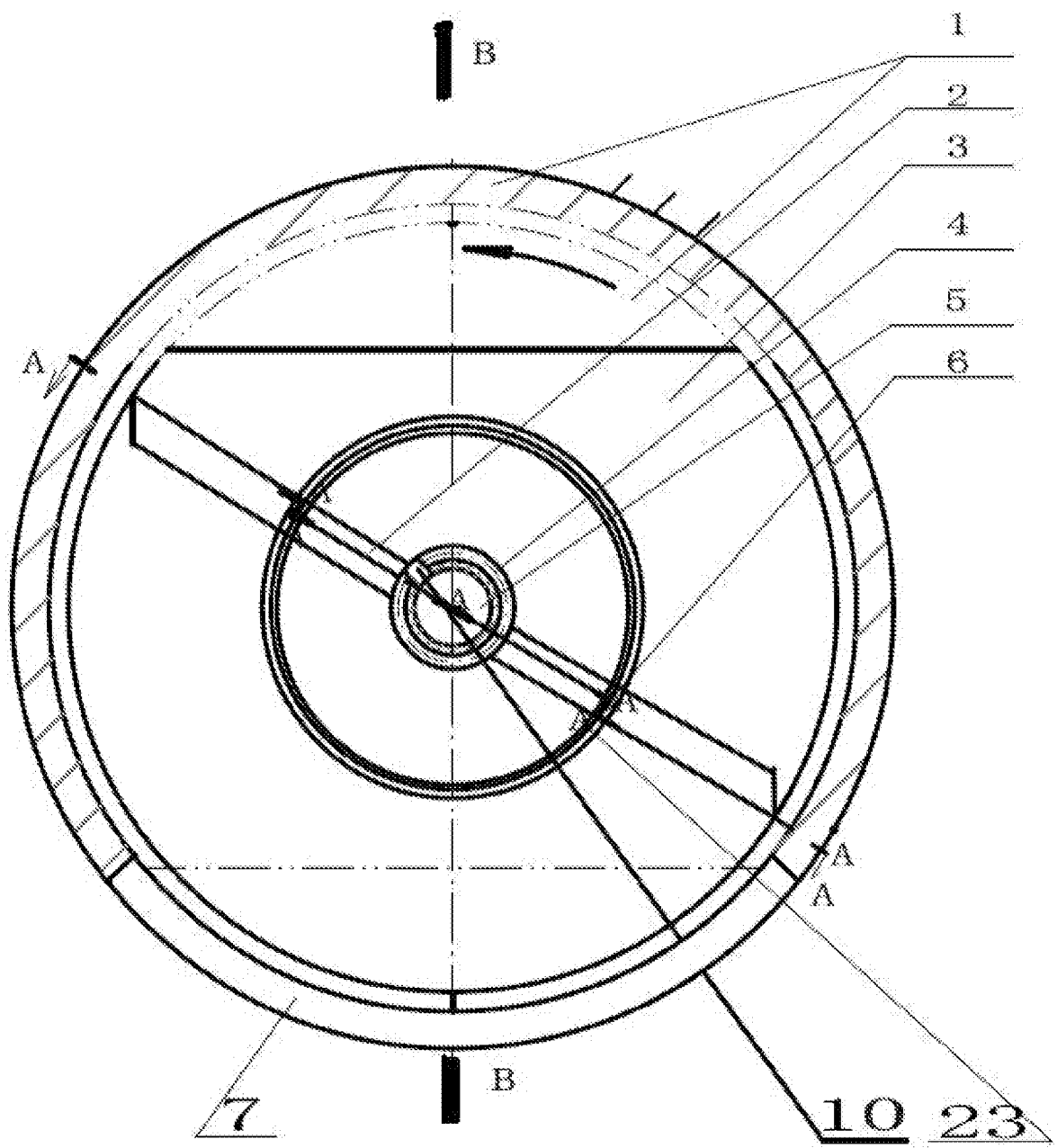
FIG. 2 is a left view of FIG. 1.
Figure 3:
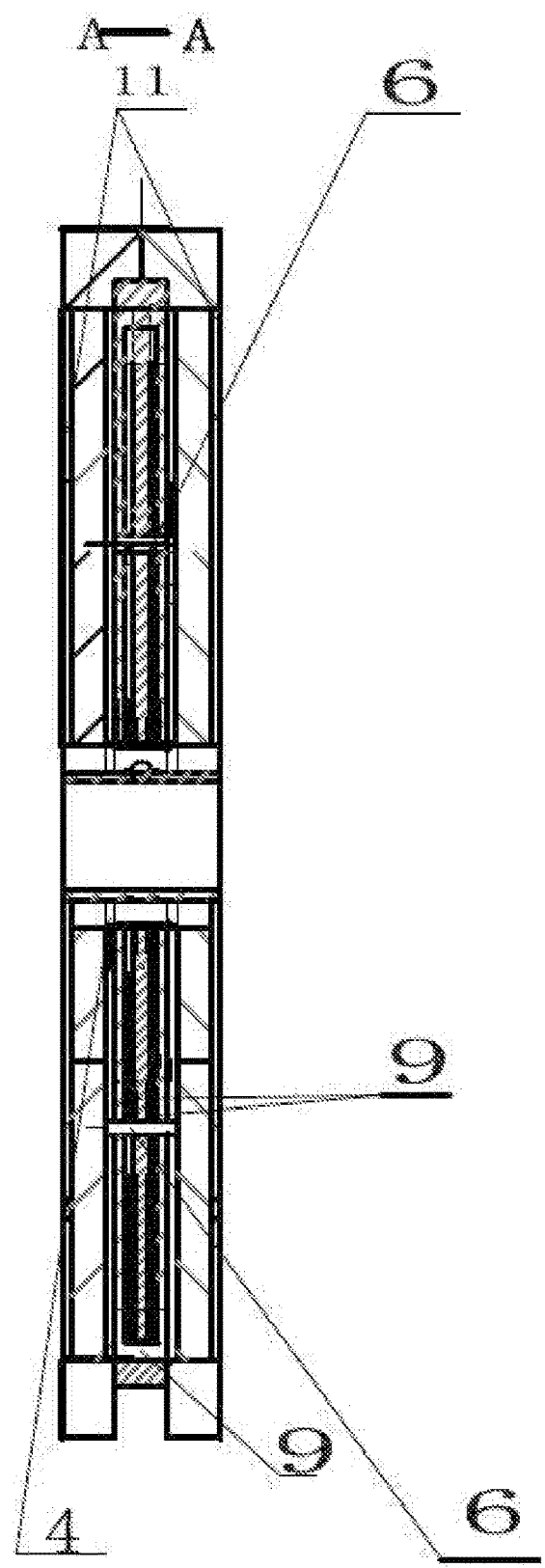
FIG. 3 is a cross-sectional view taken along section A-A in FIG. 2.
Figure 4:
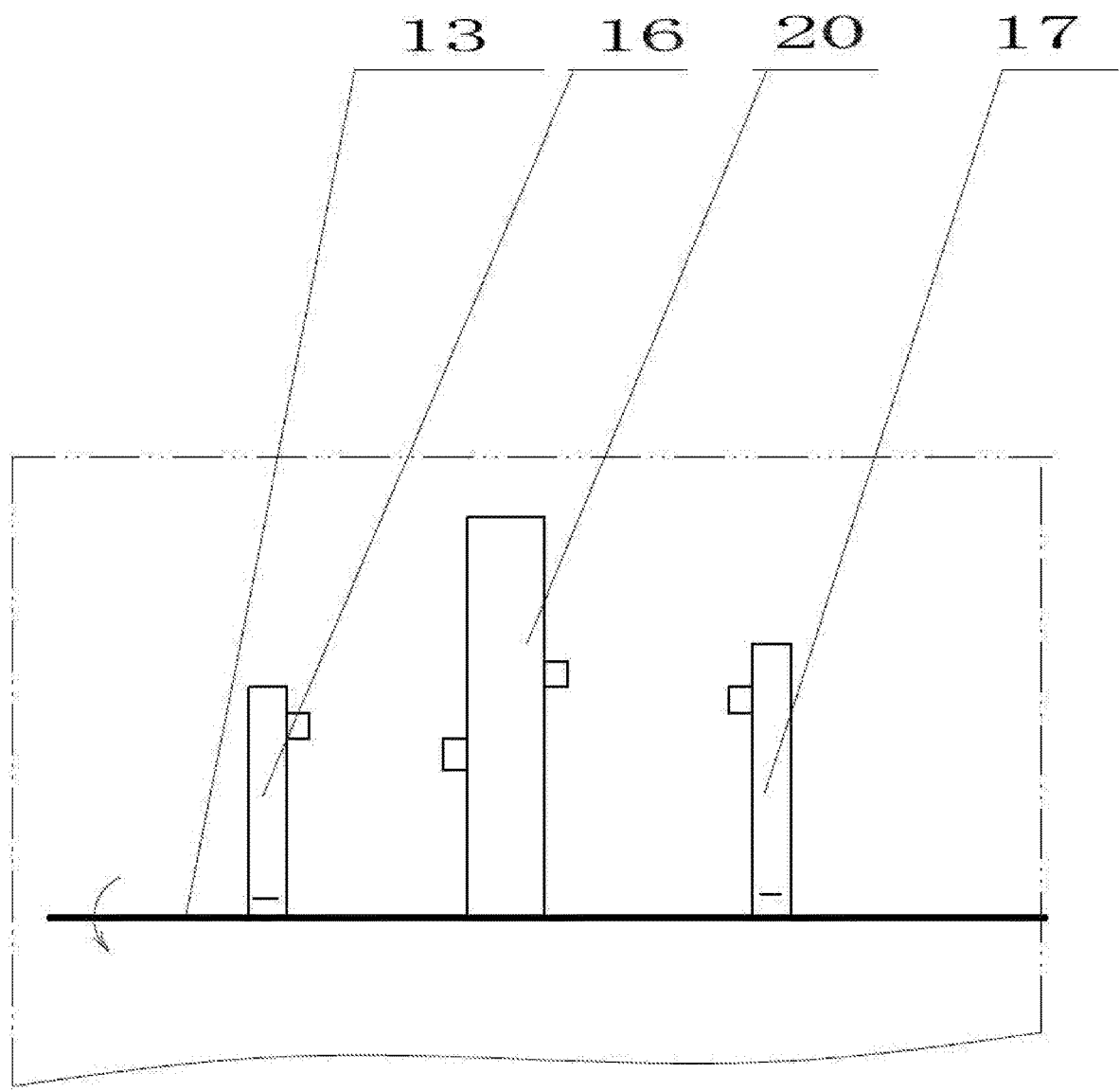
FIG. 4 is a schematic diagram showing the drive clutch and the driven clutch.
Figure 5:
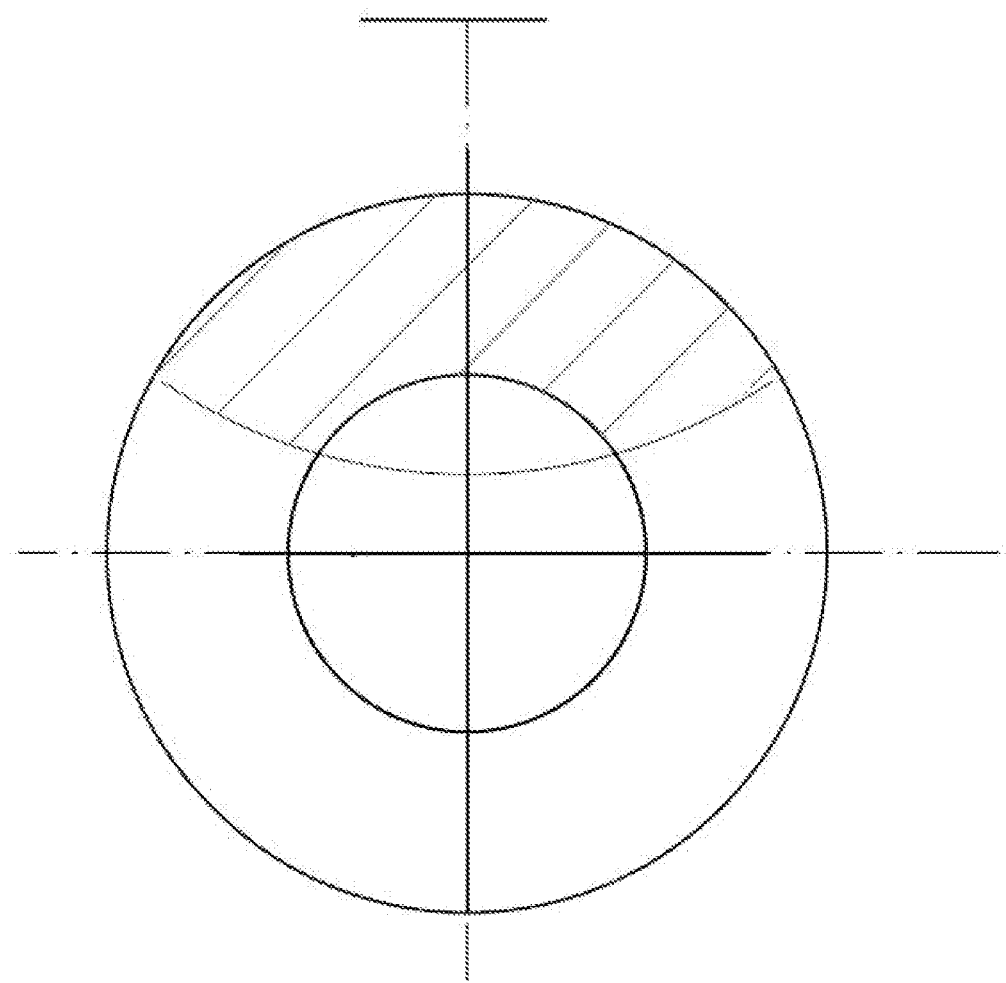
FIG. 5 is an auxiliary view obtained by viewing the direction of arrow C of FIG. 6.
Figure 6:
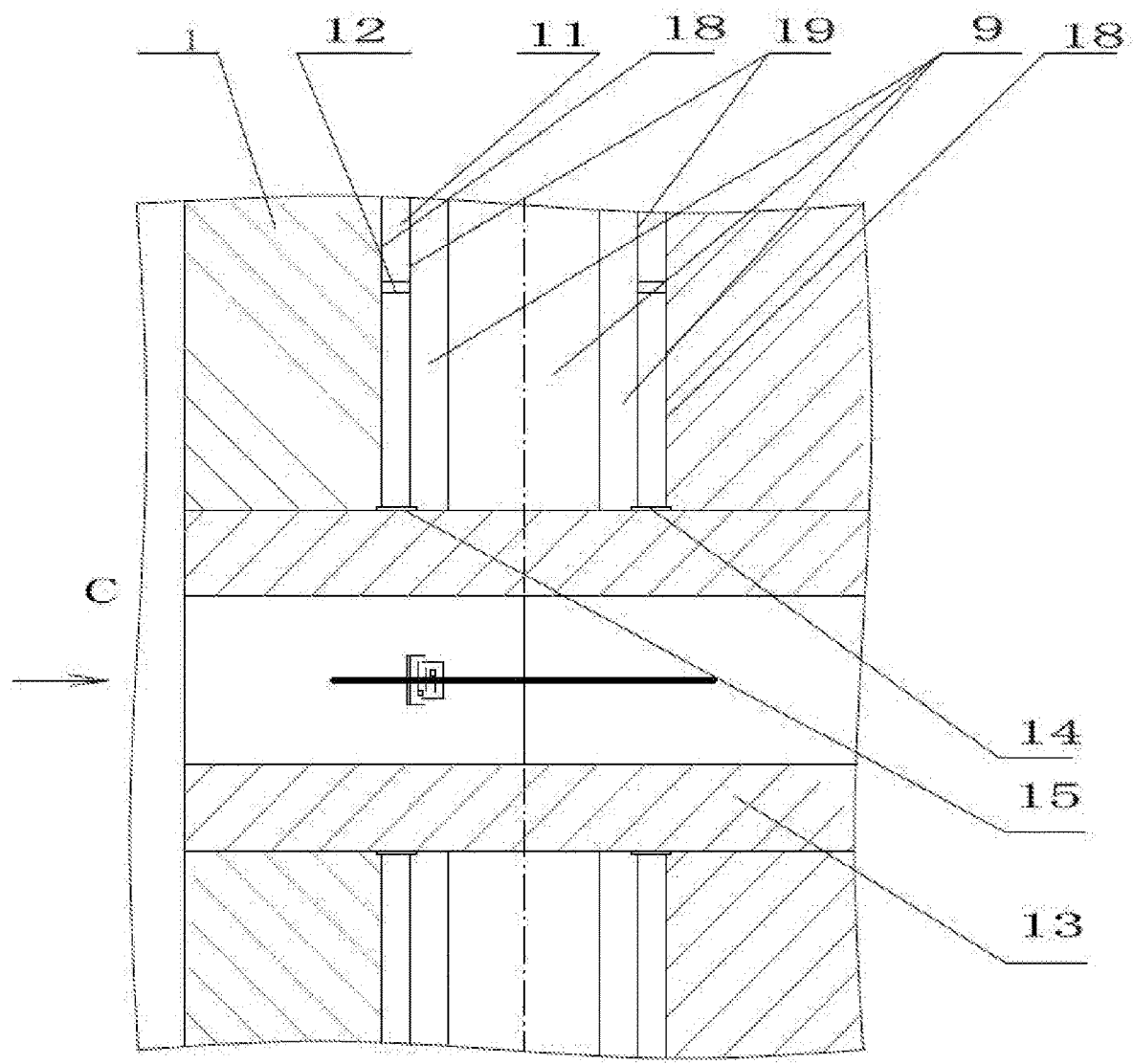
FIG. 6 is a schematic diagram showing the cake removal and squeeze device.
Figure 7:
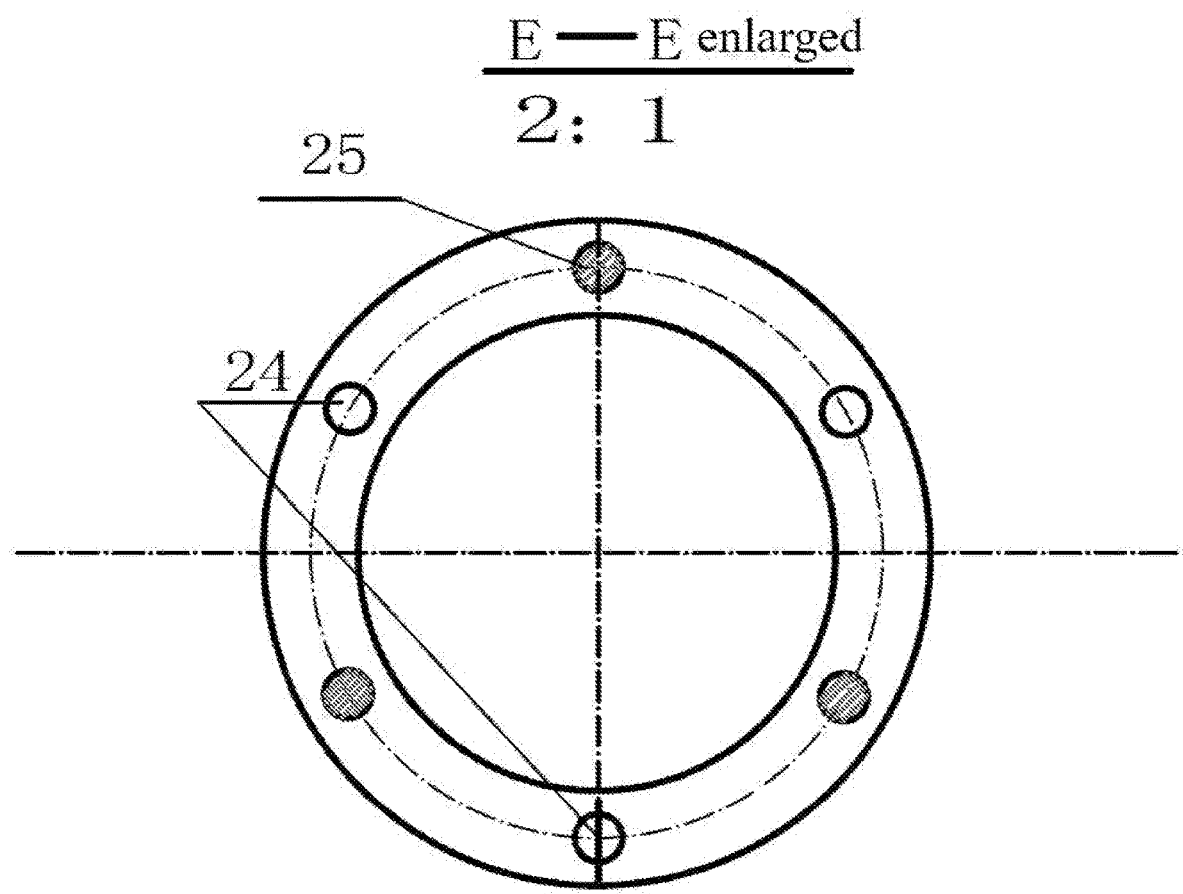
FIG. 7 is an enlarged cross-sectional view taken along section E-E in FIG. 8.
Figure 8:
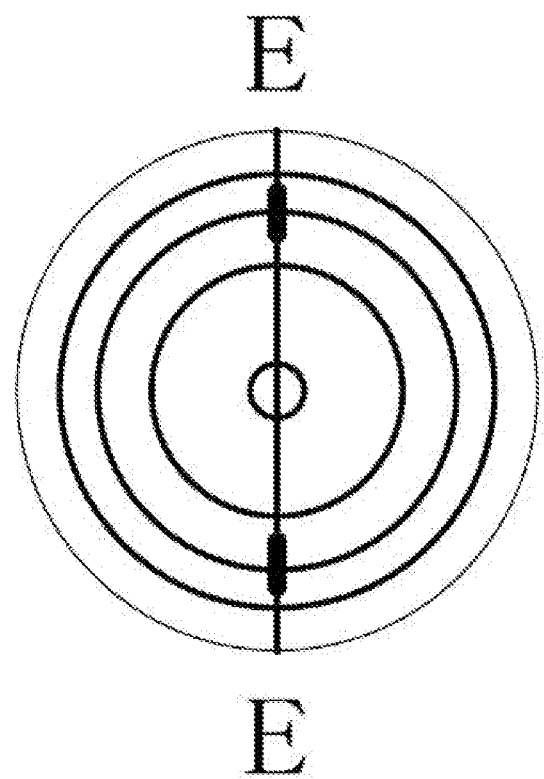
FIG. 8 is an enlarged auxiliary view obtained by viewing the direction of arrow D of FIG. 9.
Figure 9:
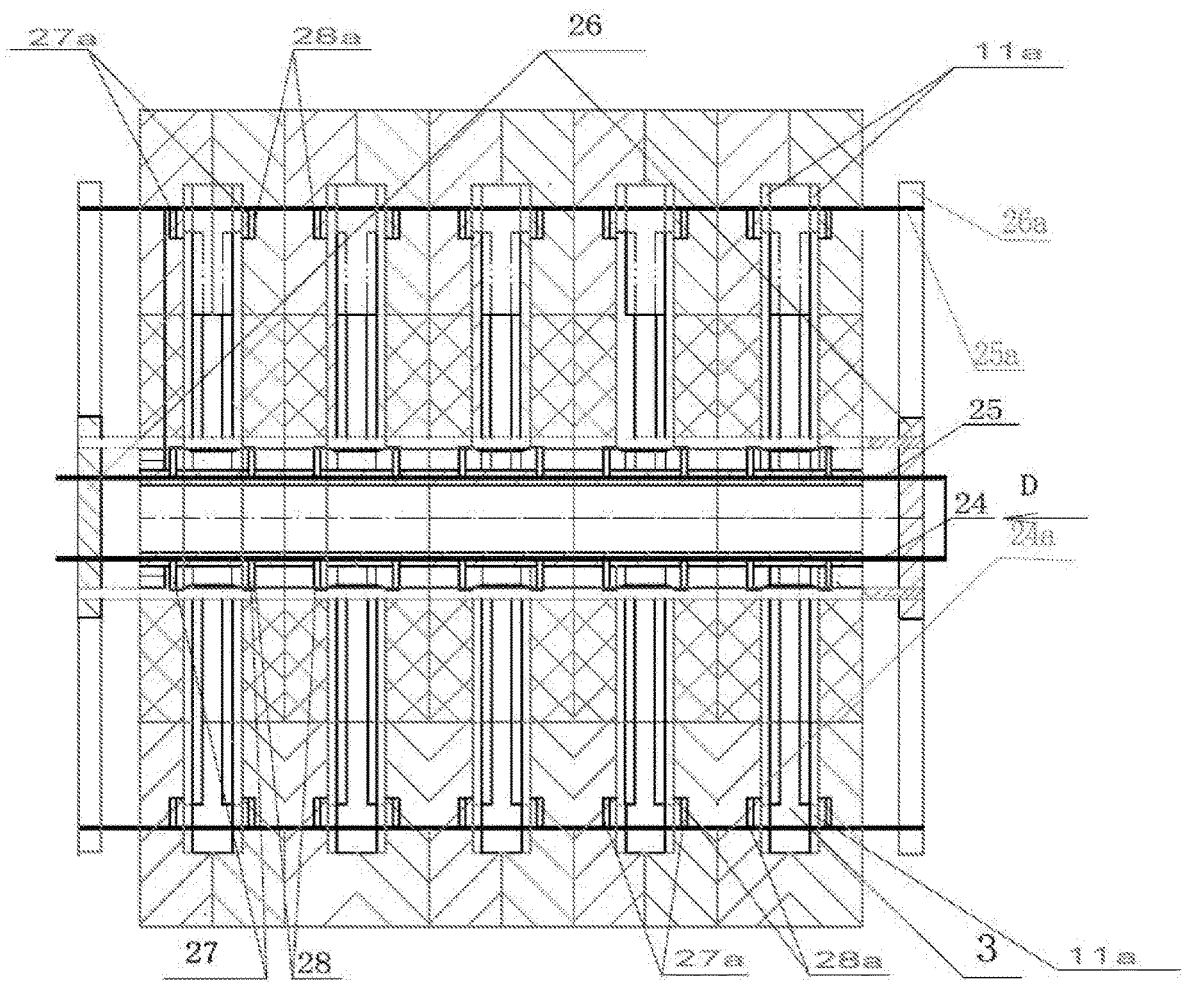
FIG. 9 is a structural schematic diagram of the pull rod, the pull rod disc, and the squeeze disc.

FIGS. 1-9 show the embodiments of the present invention. The filter chamber 9 is formed between the inner cylindrical surface of the filter plate 1 and two end surfaces in the inner cylindrical surface. The filter plates 1 are spaced apart by the support part 21 and the liquid-permeable pressure equalizing part 22. Four cylindrical holes are formed around the filter plate 1, wherein one of the holes on the upper side is connected to the clean water pump. Two washing water channels for reverse washing and normal washing are connected to each filter chamber 9. The reverse washing and normal washing are performed in turn under the control of a bidirectional valve. The washing water flows into the lower hole of the four holes around the filter plate 1 for centralized treatment. The other upper hole can be used as the feed channel 5. The feed inlet 10 is connected to the filter chamber 9, and the other lower hole collects the filtrate.

The drive shaft 13 passes through the cylindrical holes in the center of all filter plates 1. The drive shaft 13 is tubular, and can be used as the central feed channel 5 with the feed inlet 10 connected to each filter chamber 9.

The rotating plate 3 and the drive shaft 13 are slidably connected by the key 4. The squeeze disc sleeve 14 is located between the two end surfaces of the filter chamber 9 and the two adjacent filter plates 1, and is sleeved on the drive shaft 13. The annular center of the squeeze disc 11 is clamped in an annular groove of the squeeze disc sleeve 14. The left pull rod 24 and the right pull rod 25 pass through the drive shaft 13 along the axial direction of the drive shaft 13, and are arranged symmetrically with respect to the axis of the drive shaft 13. The left pull rod 24 and the right pull rod 25 are spaced apart along the circumferential direction of the drive shaft 13 and pass through the pull rod discs 26 located at two ends of the frame, respectively. Each of the two pull rod discs 26 is fixed to a brake that is hydraulically controlled or electronically controlled to be opened or closed. The brake controls the axial displacement or synchronous displacement between the left pull rod or the right pull rod and the pull rod disc, respectively. The left pull rod 24 is fixed to the pull rod disc 26 on the right side of the frame, and is slidably connected to and passes through the pull rod disc 26 on the left side of the frame. The pull rod disc 26 on the left side of the frame is fixedly connected to the right pull rod 25. The right pull rod 25 is slidably connected to and passes through the pull rod disc 26 on the right side of the frame. The left pull rod and the right pull rod are connected to one end of the connector 27, and the other end of the connector 27 passes through the outer cylindrical surface of the drive shaft 13 and is fixedly connected to the squeeze disc sleeve 14. The connector 27 passes through the drive shaft 13 and has a gap 28 for moving along the axial direction of the drive shaft 13. The filter cloth 18 is arranged between the clamping piece 19 and the squeeze disc 11, wherein the clamping piece 19 is located at the interface between the squeeze disc 11 and the end surface of the filter chamber 9. The clamping piece 19 and the squeeze disc 11 are fixedly connected by a fastener or a buckle. The clamping piece 19 is provided with a channel connected to the recess on the surface of the filter plate 1.

The head of the cake removal knife 8 closely abuts on the inner cylindrical surface of the filter chamber 9. The two sides of the cake removal knife 2 closely abut on the two end surfaces of the filter channel 9. The cake removal knife 8 is fixed in two end surfaces of the two adjacent filter plates 1 by the fixed pin 6. The fixed pin 6 passes through the rotating plate 3, and is limited within the circular gauge 23 of the rotating plate 3.

In another embodiment of the present invention, the left pull rod 24a and the right pull rod 25a are arranged on the edge of filter plate 1 and pass through all filter plates and pull rod discs 26a, and are arranged symmetrically with respect to the axis of the filter plate. The distance between the left pull rod 24a or the right pull rod 25a and the drive shaft 13 is greater than the outer diameter of the cylindrical surface of the filter chamber 9. The left pull rod and right pull rod are fixed to the squeeze disc 11a in the pull direction of all the filter chambers 9 by the connector 27a, and are slidably connected to the squeeze disc in the thrust direction. The connector 27a can move left and right in the axial gap 28a on the filter plate 1. The upper hole of the four holes around the filter plate 1 acts as the feed channel.

The drive clutch 20 and a pair of driven clutches 16 and 17 are arranged inside the cylindrical hole in the center of the filter plate of the entire filter press. The drive clutch 20 and the drive shaft 13 are both controlled by the brake to synchronously rotate, move or be disengaged. The pair of driven clutches 16 and 17 are interlocked with each other. When one of the pair of driven clutches 16 and 17 is engaged with the drive clutch 20, the other driven clutch is disengaged from the drive clutch, and vice versa. After the squeezing of the filter cake is completed, the driven clutch 16 is engaged with the drive clutch 20, and the driven clutch 17 is disengaged from the drive clutch 20. Meanwhile, the left and right pull rods 24, 25 or 24a, 25a are clamped by the brake to move synchronously left and right along with the two pull rod discs, respectively, to drive the connector 27 or 27a to force the squeeze disc 11 to return to the interface between the squeeze disc 11 and the two side end surfaces of the filter chamber 9. Under the control of the control system, the brake is released, and the driven clutch 17 is engaged with the drive clutch 20, so that the drive clutch 20 is disengaged from the driven clutch 16. As the drive shaft 13 is rotated 180 degrees clockwise and counterclockwise, the rotating plate 3 connected to the drive shaft 13 by the key is also rotated 180 degrees clockwise and counterclockwise around the axis of the drive shaft 3. The cake removal knife 2 scrapes off the filter cake in the filter chamber 9, and the filter cake drops through the cake discharge port 7.

The process continues to be performed repeatedly or is ended.

What is claimed is:

1. A filter press, comprising a frame, a hydraulic system, a plurality of filter plates, a plurality of filter chambers, a feed pump, a high-pressure clean water pump, a control system, a rotating plate, a cake removal knife, a plurality of squeeze discs, a plurality of squeeze disc sleeves, a drive shaft, a brake, a left pull rod, a right pull rod, two pull rod discs, a connector, and a plurality of clutches; wherein the plurality of filter plates are arranged on the frame, the two pull rod discs are respectively arranged at two opposite sides of the frame, the drive shaft passes through the plurality of filter plates, a center of the drive shaft defines a feed channel communicated with the feed pump, the rotating plate is connected to the drive shaft, and configured to rotate along with the drive shaft, the left pull rod and the right pull rod are symmetrically relative to the axis of the drive shaft and passes through the plurality of filter plates and the two pull rod discs, the control system is connected to the hydraulic system and the brake, the brake is connected between the clutches and the drive shaft and configured to control the clutches to move forward and away from the drive shaft, the brake is connected to the two pull rod discs and configured to control axial movement of the left pull rod and the right pull rod through the two pull rod discs, one end of the connector is connected to the left pull rod and the right pull rod, and the other end of the connector is connected to the plurality of squeeze discs, the hydraulic system is configured to compress and release the plurality of filter plates;

the plurality of filter chambers are formed between an inner cylindrical surface of two adjacent filter plates of the plurality of filter plates and two inner end surfaces in the inner cylindrical surface; the plurality of filter plates are spaced apart by a support part and a liquid-permeable pressure equalizing part; the plurality of squeeze discs are arranged at the squeeze disc sleeve and on the two inner end surfaces, four cylindrical holes are arranged around each filter plate of the plurality of filter plates, wherein a first upper cylindrical hole of the four cylindrical holes is connected to the high-pressure clean water pump; two washing water channels are connected to each filter chamber of the plurality of filter chambers, wherein a first washing water channel of the two washing water channels passes through a filter cloth from the plurality of filter plates into the plurality of filter chambers to form a reverse washing channel; a second washing water channel of the two washing water channels passes through the filter cloth from the plurality of filter chambers into the plurality of filter plates to form a normal washing channel; the control system controls a bidirectional valve to be opened, and washing water enters the normal washing channel and the reverse washing channel in turn; washed water passes through cross recesses on the plurality of filter plates into a washing water collector via a first lower cylindrical hole of the four cylindrical holes; the washing water collector is provided with a filter screen, and a particulate filter cake is discharged directly into a cake discharge port; clear washing water flows into a clean water tank, and a slurry is fed into the filter press by the feed pump; a second lower cylindrical hole of the four cylindrical holes around the each filter plate is connected to a filtrate receiving and discharging pipeline or a collecting device; and a second upper cylindrical hole of the four cylindrical holes around the each filter plate acts as a feed channel.

2. The filter press according to claim 1, wherein, the drive shaft is tubular and is used as a feed tube with a feed inlet connected to the each filter chamber; the rotating plate is slidably connected to the drive shaft by a key; the squeeze disc sleeve is located at an interface between an end surface of the each filter chamber and a filter plate of the two adjacent filter plates, and the squeeze disc sleeve is sleeved on an outer cylindrical surface of a cylindrical hole in a center of the plurality of filter plates, an annular center of each squeeze disc of the plurality of squeeze discs is engaged in an annular groove of the squeeze disc sleeve; the left pull rod and the right pull rod are arranged symmetrically with respect to an axis of the drive shaft; the left pull rod and the right pull rod are spaced apart and pass through the two pull rod discs, wherein the two pull rod discs comprise a left pull rod disc and a right pull rod disc, wherein the left pull rod disc is located on a left side of the frame and the right pull rod disc is located on a right side of the frame; each of the two pull rod discs is fixed to a brake, wherein the brake is hydraulically controlled or electronically controlled to be opened and closed, the brake controls an axial displacement or a synchronous displacement between the left pull rod and the left pull rod disc, and between the right pull rod and the right pull rod disc, respectively; the left, pull rod is fixedly connected to the right pull rod disc, and the left pull rod is slidably connected to and passes through the left pull rod disc; the left pull rod disc is fixedly connected to the right pull rod; the right pull rod is slidably connected to and passes through the right pull rod disc; the left pull rod and the right pull rod are connected to a first end of each of the first connector and the second connector, and a second end of each of the first connector and the second connector passes through an outer cylindrical surface of the drive shaft and is fixedly connected to the squeeze disc sleeve; each of the first connector and the second connector passes through the drive shaft and has a gap, wherein the gap allows the first connector and the second connector to move along an axial direction of the drive shaft.

3. The filter press according to claim 1, wherein, the cake removal knife abuts on an inner cylindrical surface and two end surfaces of the each filter chamber, and the cake removal knife is fixed in the two inner end surfaces of the two adjacent filter plates by a fixed pin of the cake removal knife;

the fixed pin of the cake removal knife passes through the rotating plate, and is limited within a circular gauge on the rotating plate; ribs and fluid ports are spaced apart on each squeeze disc of the plurality of squeeze discs, and the filter cloth is arranged between the each squeeze disc and an end surface of the two end surfaces of the each filter chamber; and the filter cloth is clamped between the each squeeze disc and a clamping piece; the clamping piece is fixed on the each squeeze disc and abuts on the end surface of the each filter chamber; the clamping piece is provided with a filtrate channel connected to the cross recesses on a plurality of surfaces of the plurality of filter plates.

4. The filter press according to claim 1, wherein, the left pull rod and the right pull rod are arranged on edges of the plurality of filter plates and pass through the plurality of filter plates and the two pull rod discs; the left pull rod and the right pull rod are symmetrically arranged with respect to an axis of the plurality of filter plates; a distance between the left pull rod or the right pull rod and the drive shaft is greater than an outer diameter of a cylindrical surface of the each filter chamber; the left pull rod and the right pull rod are fixedly connected to first squeeze discs of the plurality of squeeze discs by the first connector, wherein the first squeeze discs are in a pull direction of the plurality of filter chambers, and the left pull rod and the right pull rod are slidably connected to second squeeze discs of the plurality of squeeze discs by the second connector, wherein the second squeeze discs are in a thrust direction of the plurality of filter chambers; each of the first connector and the second connector moves left and right in an axial gap on the plurality of filler plates.

5. The filter press according to claim 1, wherein, the plurality of clutches comprise a drive clutch and a pair of driven clutches, wherein the drive clutch and the pair of driven clutches are arranged inside a cylindrical hole in a center of the plurality of filter plates of the filter press; the drive clutch and the drive shaft are both controlled by the brake to simultaneously rotate, move or be disengaged; the pair of driven clutches are interlocked with each other, wherein when a first driven clutch of the pair of driven clutches is engaged with the drive clutch, a second driven clutch of the pair of driven clutches is disengaged from the drive clutch; when the second driven clutch is engaged with the drive clutch, the first driven clutch is disengaged from the drive clutch; the first driven clutch and the drive clutch control the rotating plate to rotate, and the second driven clutch and the drive shaft control the plurality of squeeze discs to squeeze the particulate filter cake.

6. The filter press according to claim 2, wherein, the cake removal knife abuts on an inner cylindrical surface and two end surfaces of the each filter chamber, and the cake removal knife is fixed in the two inner end surfaces of the two adjacent filter plates by a fixed pin of the cake removal knife; the fixed pin of the cake removal knife passes through the rotating plate, and is limited within a circular gauge on the rotating plate; ribs and fluid ports are spaced apart on each squeeze disc of the plurality of squeeze discs, and the filter cloth is arranged between the each squeeze disc and an end surface of the two end surfaces of the each filter chamber; and the filter cloth is clamped between the each squeeze disc and a clamping piece; the clamping piece is fixed on the each squeeze disc and abuts on the end surface of the each filter chamber; the clamping piece is provided with a filtrate channel connected to the cross recesses on a plurality of surfaces of the plurality of filter plates.

7. The filter press according to claim 2, wherein, the plurality of clutches comprise a drive clutch and a pair of driven clutches, wherein the drive clutch and the pair of driven clutches are arranged inside the cylindrical hole in the center of the plurality of filter plates of the filter press; the drive clutch and the drive shaft are both controlled by the brake to simultaneously rotate, move or be disengaged; the pair of driven clinches are interlocked with each other, wherein when a first driven clutch of the pair of driven clutches is engaged with the drive clutch, a second driven clutch of the pair of driven clutches is disengaged from the drive clutch; when the second driven clutch is engaged with the drive clutch, the first driven clutch is disengaged from the drive clutch; the first driven clutch and the drive clutch control the rotating plate to rotate, and the second driven clutch and the drive shaft control the plurality of squeeze discs to squeeze the particulate filter cake.

8. The filter press according to claim 3, wherein, the plurality of clutches comprise a drive clutch and a pair of driven clinches, wherein the drive clutch and the pair of driven clutches are arranged inside a cylindrical hole in a center of the plurality of filter plates of the filter press; the drive clutch and the drive shaft are both controlled by the brake to simultaneously rotate, move or be disengaged; the pair of driven clutches are interlocked with each other, wherein when a first driven clutch of the pair of driven clutches is engaged with the drive clutch, a second driven clutch of the pair of driven clutches is disengaged from the drive clutch; when the second driven clutch is engaged with the drive clutch, the first driven clutch is disengaged from the drive clutch; the first driven clutch and the drive clutch control the rotating plate to rotate, and the second driven clutch and the drive shaft control the plurality of squeeze discs to squeeze the particulate filter cake.

9. The filter press according to claim 6, wherein, the plurality of clutches comprise a drive clutch and a pair of driven clutches, wherein the drive clutch and the pair of driven clutches are arranged inside the cylindrical hole in the center of the plurality of filter plates of the filter press; the drive clutch and the drive shaft are both controlled by the brake to simultaneously rotate, move or be disengaged; the pair of driven clutches are interlocked with each other, wherein when a first driven clutch of the pair of driven clutches is engaged with the drive clutch, a second driven clutch of the pair of driven clutches is disengaged from the drive clutch; when the second driven clutch is engaged with the drive clutch, the first driven clutch is disengaged from the drive clutch; the first driven clutch and the drive clutch control the rotating plate to rotate, and the second driven clutch and the drive shaft control the plurality of squeeze discs to squeeze the particulate filter cake.

\* \* \* \* \*